United States Patent
Kim et al.

[11] Patent Number: 6,019,008
[45] Date of Patent: Feb. 1, 2000

[54] LINEAR MOTION APPARATUS UNDER ULTRA HIGH VACUUM

[75] Inventors: Sung-Bock Kim, Daejeon; Wan-Soo Yun, Kyunggi-Do; El-Hang Lee, Daejeon, all of Rep. of Korea

[73] Assignee: Electronics and Telecommunications Research Institute, Daejeon, Rep. of Korea

[21] Appl. No.: 08/903,797

[22] Filed: Jul. 31, 1997

[30] Foreign Application Priority Data

Dec. 6, 1996 [KR] Rep. of Korea ............ 96-62620

[51] Int. Cl.[7] .......................................... B25J 1/08
[52] U.S. Cl. ...................... 74/89.22; 74/18.2; 74/503; 414/3; 414/7; 414/935; 901/21; 403/109.1
[58] Field of Search ................ 414/2, 3, 7, 935, 414/749; 901/21, 48; 74/89.2, 18.2, 511 A, 511 R, 506, 503; 403/109.7, 109.1, 377

[56] References Cited

U.S. PATENT DOCUMENTS

| | | | |
|---|---|---|---|
| 616,676 | 12/1898 | Larkin | 74/89.22 |
| 1,070,167 | 8/1913 | Nitschke | 74/511 A |
| 2,341,401 | 2/1944 | White | 74/511 A |
| 2,822,067 | 2/1958 | Price | 403/109.7 |
| 3,367,632 | 2/1968 | Vail | 403/109.7 |
| 4,114,460 | 9/1978 | Oto | 74/18.2 |
| 4,114,874 | 9/1978 | Mattila | 74/505 |
| 4,261,614 | 4/1981 | Rice | 74/89.22 |
| 4,850,779 | 7/1989 | Cashell et al. | 414/3 |
| 4,893,980 | 1/1990 | Balter | 414/3 |
| 5,139,383 | 8/1992 | Polyak et al. | 414/3 |
| 5,324,086 | 6/1994 | Hammer | 403/109.7 |

*Primary Examiner*—Tamara L. Graysay
*Assistant Examiner*—William C Joyce
*Attorney, Agent, or Firm*—Jacobson, Price, Holman & Stern, PLLC

[57] ABSTRACT

A linear motion apparatus for moving an object in a vacuum chamber comprising an antenna or a telescoping shaft such as a fishing rod to effectively utilize space, and to avoid the need of a rear projection thereby achieving stability. The linear motion apparatus includes: a body having a space portion penetrated horizontally; a rotary handle which penetrates at a right angle to the space portion of the body thereby controlling a linear motion; locking portion which is mounted in the space portion of the body, is inserted into a shaft of the rotary handle, and used to lock the motion; a guide rod which is formed as a multistage rod, whose one end is inserted and fixed into a predetermined position of the space portion of the body; linear motion force providing portion whose one end is fixed to the rotary plate and the other end is fixed to a nose portion of the guide rod, thereby providing a linear motion force to the guide rod; and a bellows seal which surrounds a circumference of the guide rod, is shrunken or expanded according to a linear motion of the guide rod. As a result, this apparatus performs a linear motion control by a contraction and expansion under ultra high vacuum.

2 Claims, 4 Drawing Sheets

LINEAR MOTION APPARATUS UNDER ULTRA HIGH VACUUM

BACKGROUND OF THE INVENTION

1. Field of the Invention

The present invention generally relates to a linear motion apparatus for performing a linear motion in an ultra high vacuum. More particularly, it relates to a linear motion apparatus under ultra high vacuum which performs a linear motion through contraction and expansion, does not need rear space to move, and achieves a stability because a rear projection is not necessary.

2. Description of the Conventional Art

In recent times, many modern manufacturing techniques such as a semiconductor fabrication require an ultra high vacuum. To maintain high precision and high purity, more and more fabrication processes need to be done in a vacuum chamber without exposure to air. For this, workpieces should be freely moved, transported, rotated, installed and detached in the vacuum condition. The trend of a large-sized vacuum equipment due to a mass-production has brought about a large-sized motion apparatus due to an increase of a moving distance. The same space has been required at the rear part of the equipment as the space corresponding to the travel distance of the linear motion apparatus. This need of additional space has given many restrictions to the system design.

A conventional linear motion apparatus will be described with reference to FIGS. 1A to 1F.

FIG. 1A shows a welded bellows seal. This apparatus gets the linear motion by dial turns of a handle, so that the handle holds longer length than the distance of an actual motion.

FIG. 1B shows a push-pull linear motion apparatus. The basics of this apparatus are similar to that of FIG. 1. But the moving method is different from that of FIG. 1. Specifically, a linear motion of FIG. 1B is achieved by a push-pull motion of a handle, and space is required toward the handle by the moving distance.

FIG. 1C shows a heavy duty linear motion apparatus; and FIG. 1D shows a heavy duty push-pull linear motion apparatus. Their operations are similar to those of FIGS. 1A-1B. But these apparatuses shown in FIGS. 1C-1D can support heavier weight, and also require the rear space by the moving distance.

FIG. 1E shows a rack-pinion linear motion apparatus. This apparatus converts a rotating motion of the rotary handle into a linear motion through a gear of a rail-shape, and requires a rail and space which correspond to a linear moving distance.

FIG. 1F shows a magnetically coupled sample transporting apparatus. This apparatus performs a linear motion by using a magnetic force to a cylindrical rod. While the moving distance is very long, this apparatus also needs space in the rear thereof by the moving distance. Since the apparatus is very long, it may get into a danger of collision.

In the aforementioned linear motion apparatuses, the rear space of the vacuum equipment is needed inevitably by the linear motion interval. Since a shaft is not bent or not folded in the linear motion mechanism of the conventional apparatus, the conventional apparatuses need double spaces of a corresponding portion in response to a forward moving distance. This results in over space longer than the moving distance in the rear thereof. Such space is not only unnecessary in installing the experimental equipments but also unstable because a long rod from the apparatus is protruded.

SUMMARY OF THE INVENTION

Accordingly, the present invention is directed a linear motion apparatus under ultra high vacuum that substantially obviates one or more of the problems due to limitations and disadvantages of the conventional art.

It is an object of the present invention to provide a linear motion apparatus under an ultra high vacuum which removes an unnecessary rear space of a linear motion apparatus by using an antenna or a folding shaft such as a fishing rod thereby effectively utilizing space, and removes a rear projection thereby achieving a security.

To achieve the above object, the linear motion apparatus under an ultra high vacuum includes:

a body having a space portion penetrated horizontally;

a rotary handle which is connected to a right angle shaft which penetrates through and is fixed to a rotary plate;

locking screw mounted in a screw hole through the body, restrict a rotation of the rotary plate by friction force;

a guide rod which is formed as a multistage rod, whose one end is inserted and fixed into a predetermined position of the space portion of the body;

a wire whose one end is fixed by weld to the rotary plate and the other end is fixed by weld to a nose portion of the guide rod, thereby providing a linear motion force to the guide rod; the nose portion which has screw holes for installation of objects; and a bellows seal which surrounds a circumference of the guide rod, is shrunken or expanded according to linear motion of the guide rod.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The preferred embodiment of the present invention will become apparent from a study of the following detailed description, when viewed in light of the accompanying drawings.

Figure 1A:
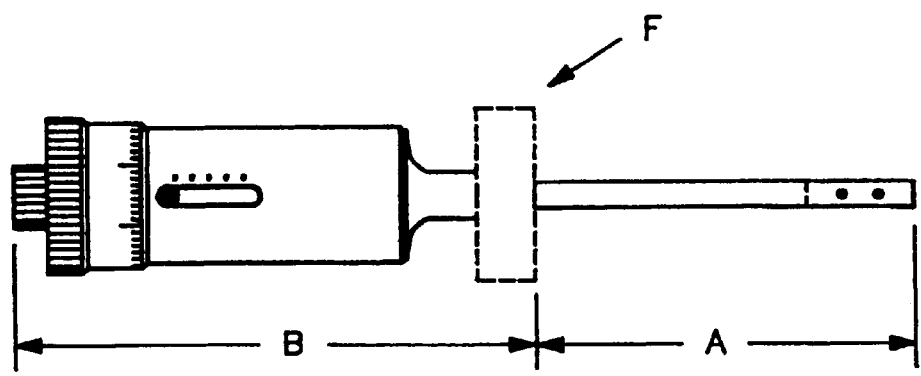
FIGS. 1A to 1F show general linear motion apparatuses.
Figure 1B:
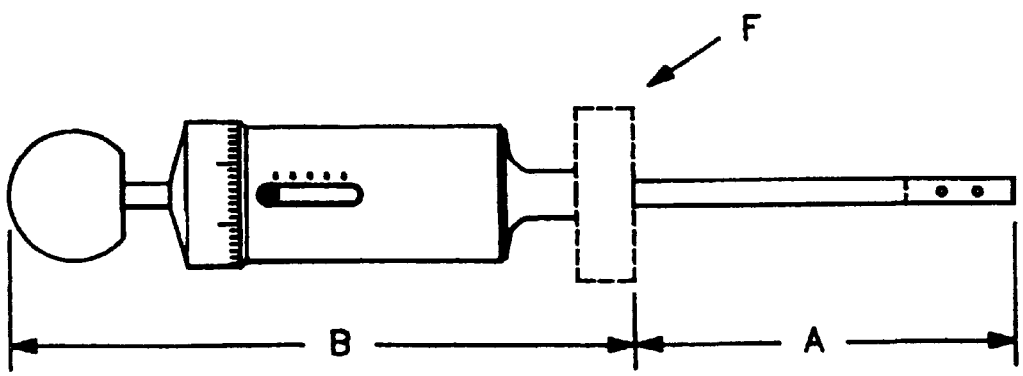
Figure 1C:
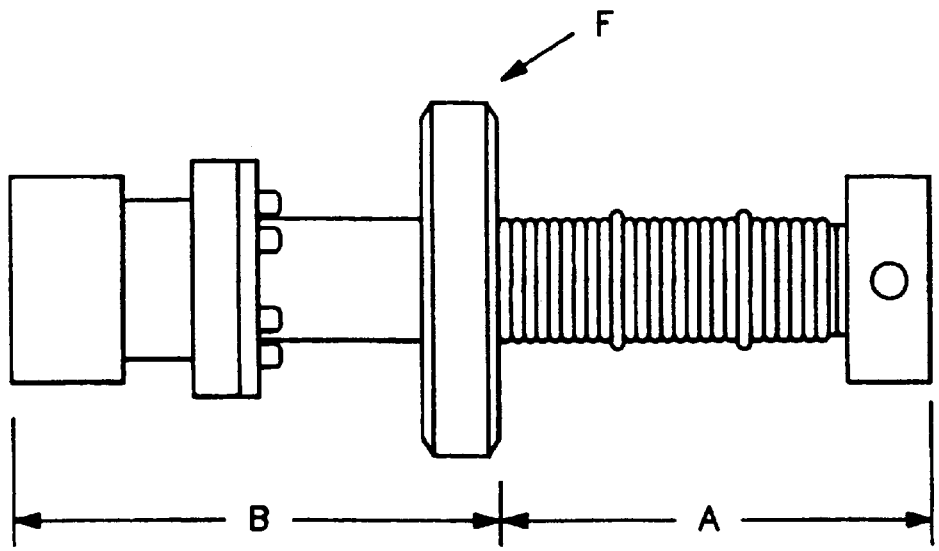
Figure 1D:
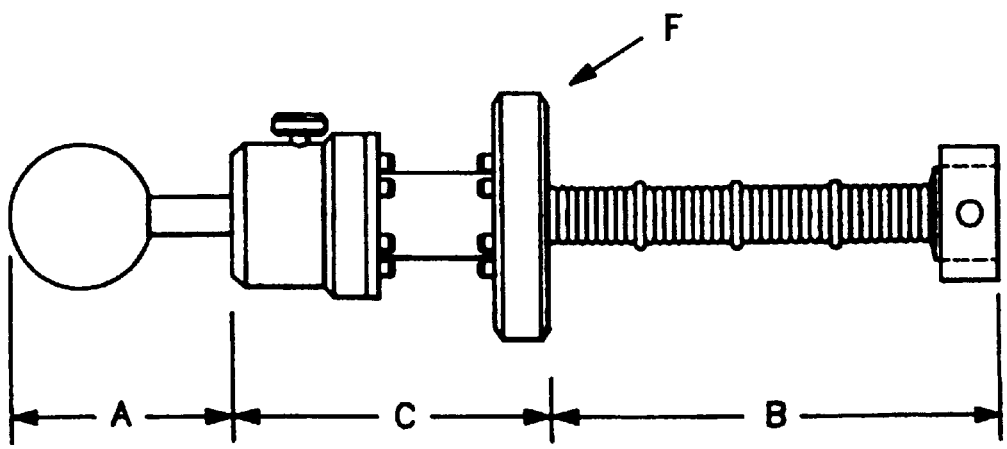
Figure 1E:
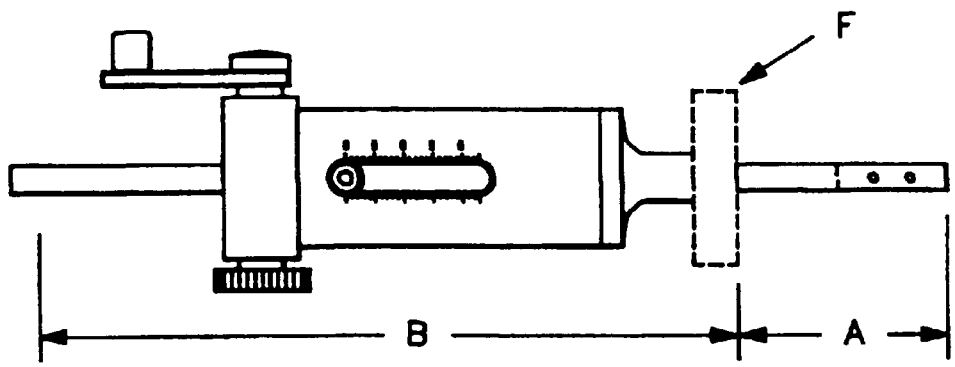
Figure 1F:
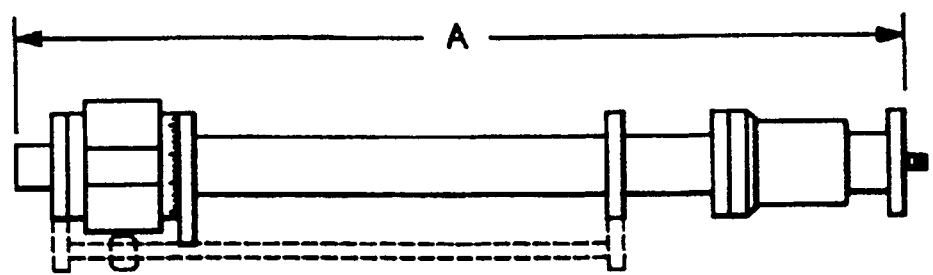
Figure 2:
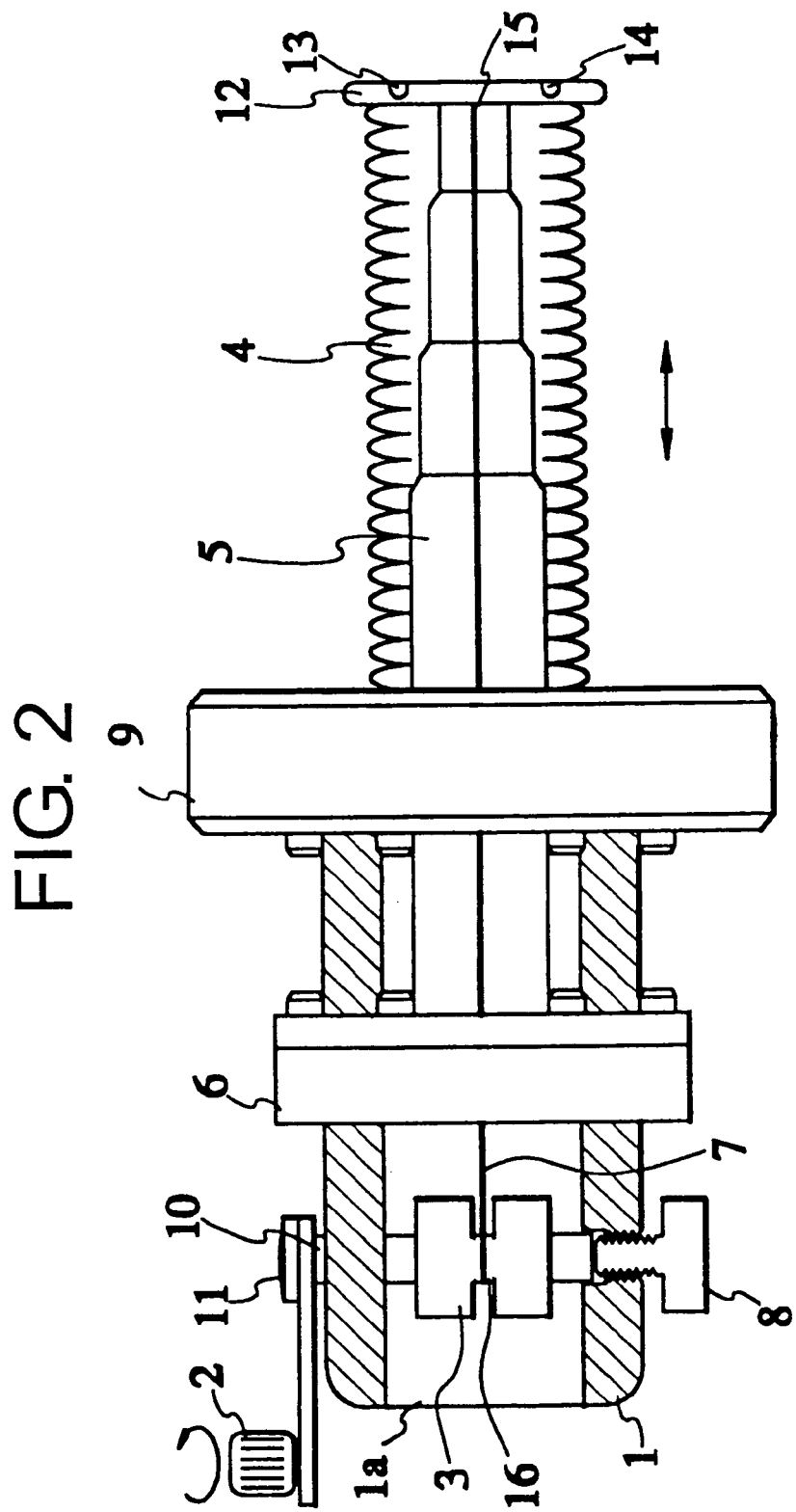
FIG. 2 is a cross-sectional view illustrating a linear motion apparatus in accordance with a preferred embodiment of the present invention.

FIG. 2 is a cross-sectional view illustrating a linear motion apparatus in accordance with a preferred embodiment of the present invention. Reference numerals are a main body 1, a space portion 1a, a rotary handle 2, a rotary plate 3, a bellows seal 4, a guide rod 5, a first flange 6, a wire 7, a locking screw 8, a second flange 9, a right angle shaft 10, a screw 11, a nose portion 12, screw holes 13, 14, and welds 15, 16.

A linear motion apparatus under an ultra high vacuum according to the present invention removes the space needed in the rear, and increase a space utilization.

As shown in FIG. 2, the linear motion apparatus according to the present invention includes a cylindrical body 1 having a space portion 1a penetrated horizontally. The rotary handle 2 is connected to a right angle shaft 10 in the space portion 1a by the screw 11.

The rotary plate 3 of a reel shape is mounted in the space portion 1a of the body 1, and fixed to the right angle shaft 10 with the rotary handle 2 by the screw 11.

The bellows seal 4 can be shrunken or expanded according to the force of linear motion from outside one. One end of the bellows seal 4 is fixed the second flange 9. The apparatus also includes the guide rod 5 which is inserted into the bellows seal 4, and provides a linear motion simultaneously with preventing a bend of the bellows seal 4.

In this case, a welded bellows seal for ultra high vacuum is used as the bellows seal 4. The guide rod 5 is formed as a multistage rod like a fishing rod. Accordingly, the bellows seal 4 can be shrunken and expanded by it.

One end of the guide rod 5 is fixed to the first flange 6 inserted into a circumference of the body 1. One end of the wire 7 is fixed to a nose portion 12 of the guide rod 5 by weld 15 and the other end is fixed to the rotary plate 3 by weld 16, thereby providing a linear motion force to the guide rod 5 of the multistage rod. The nose portion 12 has screw holes 13, 14 which are used to install objects.

At this time, in order to let the guide rod 5 be stable at a certain distance, the present invention includes the locking screw 8 which is mounted in a screw hole (not shown) through the body 1, contacts the rotary plate 3. The locking screw 8 restricts a rotation position thereof by the tightening force.

On the other hand, the second flange 9 having a knife edge (not shown) for vacuum seal is mounted to one side of the body 1. The second sealing flange (9) engages a vacuum chamber wall for sealing the telescoping rod within the chamber Operations of the aforementioned present invention will be described below. The rotary plate 3 is rotated by the rotation of the right angle shaft 10 with the rotary handle 2, the wire 7 is unwound from the rotary plate 3, the wire 7 pushes the guide rod 5, and thereby the multistage rod of the guide rod 5 is sequentially expanded. Accordingly, the bellows seal 4 surrounding the circumference of the guide rod 5 is expanded. When the guide rod 5 is linearly expanded by a desired length, the locking screw 8 can be tightened, thereby restricting the rotation of the right angle shaft 10.

On the other hand, in order to shrink the guide rod 5 and the bellows seal 4, the right angle shaft 10 should be rotated reversely after loosening the locking screw 8 for the rotary plate 3 to wind the wire 7. This winding force is operated as force for sequentially folding the multistage rod of the spread guide rod 5, thereby shrinking the bellows seal 4.

The aforementioned linear motion apparatus is employed to achieve more simple and small-sized structure.

A moving distance per one rotation of the right angle shaft 10 is determined by controlling a diameter of the rotary plate in the present invention. In conclusion, a precise manipulation and a coarse manipulation are possible in the present invention. This apparatus can be installed horizontally or vertically.

As described above, according to the present invention, since the bellows seal can be shrunken and expanded by the motion of the guide rod 5 which is driven by the rotary motion of the reel-like rotary plate 3, the rear space of the vacuum equipment is not necessary. Accordingly, the present invention eliminates a space inefficiency and achieves safety in using the linear motion apparatus.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A linear motion apparatus under an ultra high vacuum, comprising:

a body having a space portion penetrated horizontally;

a rotary handle attached to a right angle shaft which extends at a right angle through said space portion of said body, wherein said right angle shaft penetrates through and is fixed to a rotary plate in said space portion of said body thereby controlling a linear motion;

a locking screw mounted in a screw hole through said body to restrict a rotation of the rotary plate by friction force;

a guide rod which is formed as a multistage telescoping rod, whose one end is inserted and fixed into a predetermined position of said space portion of said body;

a wire having two ends whose one end is fixed to said rotary plate by weld and the other end is fixed to a nose portion of said guide rod by weld, thereby pushes and pulls said guide rod;

a bellows seal which surrounds a circumference of said guide rod, is shrunken or expanded according to linear motion of said guide rod; and a first sealing flange adapted to engage a vacuum chamber wall for sealing the telescoping rod within a vacuum chamber.

2. The linear motion apparatus as set forth in claim 1, further comprising:

a second flange which is inserted into a circumference of said body, and fixes said guide rod inserted into said space portion of said body.

* * * * *